United States Patent
Chen et al.

(10) Patent No.: US 8,836,298 B1
(45) Date of Patent: Sep. 16, 2014

(54) MULTI-PHASE SWITCHING REGULATOR AND CONTROL METHOD THEREOF

(71) Applicants: Tung-Sheng Chen, Kaohsiung (TW); Hung-Shou Nien, Changhua (TW); Yu-Wei Chang, Changhua (TW); Chung-Sheng Cheng, Zhubei (TW)

(72) Inventors: Tung-Sheng Chen, Kaohsiung (TW); Hung-Shou Nien, Changhua (TW); Yu-Wei Chang, Changhua (TW); Chung-Sheng Cheng, Zhubei (TW)

(73) Assignee: Richtek Technology Corporation, Chupei, HsinChu (TW)

( * ) Notice: Subject to any disclaimer, the term of this patent is extended or adjusted under 35 U.S.C. 154(b) by 0 days.

(21) Appl. No.: 13/968,130

(22) Filed: Aug. 15, 2013

(51) Int. Cl.
*G05F 1/40* (2006.01)
*G05F 3/04* (2006.01)

(52) U.S. Cl.
CPC .......................................... *G05F 3/04* (2013.01)
USPC ......................................................... 323/268

(58) Field of Classification Search
USPC .......... 323/268, 269, 271, 275, 282, 285, 304
See application file for complete search history.

(56) References Cited

U.S. PATENT DOCUMENTS

| | | | |
|---|---|---|---|
| 6,674,274 B2 * | 1/2004 | Hobrecht et al. | 323/285 |
| 6,764,274 B2 | 7/2004 | Maclay | |
| 7,119,508 B2 * | 10/2006 | Kurosawa et al. | 318/400.04 |
| 7,492,134 B2 | 2/2009 | Tang et al. | |
| 8,643,354 B2 * | 2/2014 | Chang et al. | 323/285 |
| 2010/0191986 A1 | 7/2010 | Su et al. | |

* cited by examiner

*Primary Examiner* — Adolf Berhane
(74) *Attorney, Agent, or Firm* — Tung & Associates

(57) ABSTRACT

The present invention discloses a multi-phase switching regulator and a control method thereof. The multi-phase switching regulator includes plural power stage circuits, wherein at least one power stage circuit is enabled or disabled according to a phase adding/shedding signal; at least one zero current detection circuit, which is coupled to one of the power stage circuits, for generating a trigger signal according to an inductor current in a corresponding one of the power stage circuits, a zero current reference signal, and an average reference signal; and a phase control circuit controlling the phase adding/shedding operation according to the trigger signal.

4 Claims, 6 Drawing Sheets

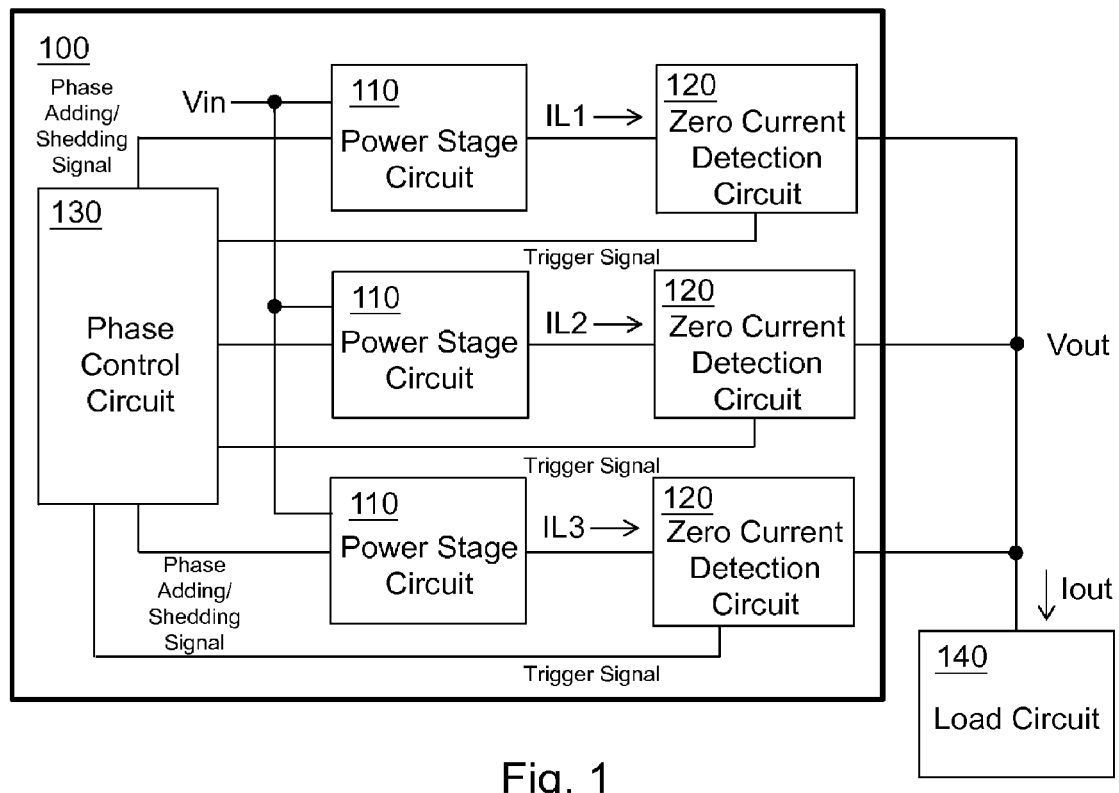
Fig. 1
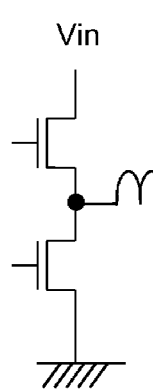 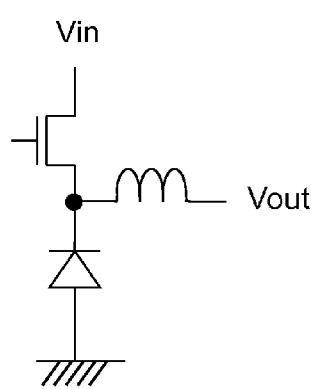 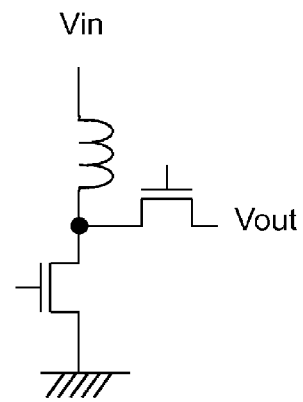
Fig. 2A      Fig. 2B      Fig. 2C

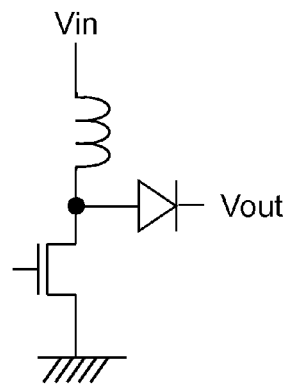
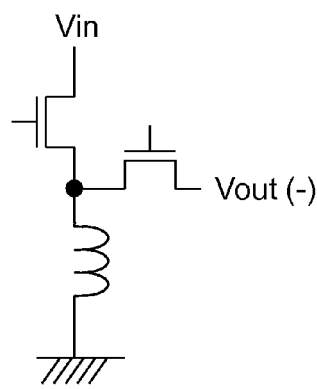
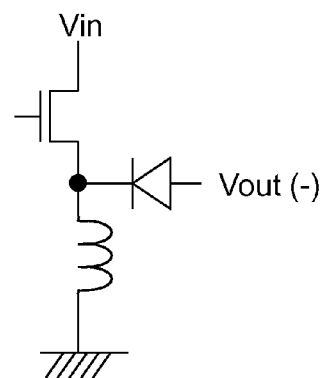
Fig. 2D  Fig. 2E  Fig. 2F
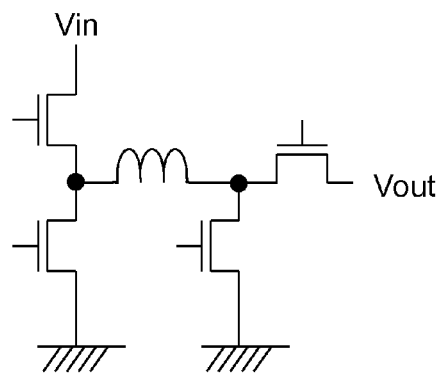
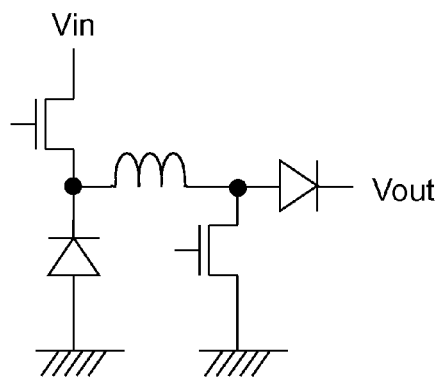
Fig. 2G  Fig. 2H
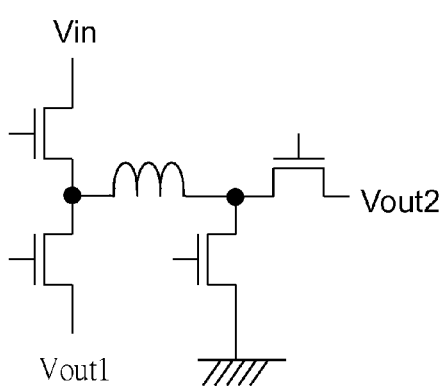
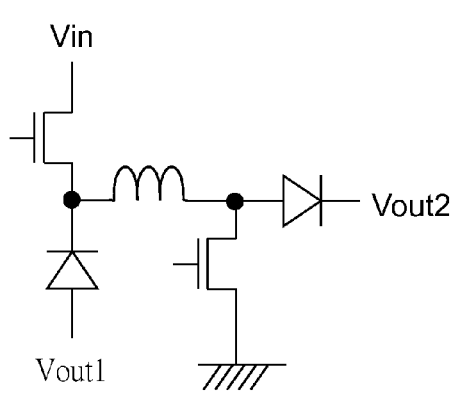
Fig. 2I  Fig. 2J

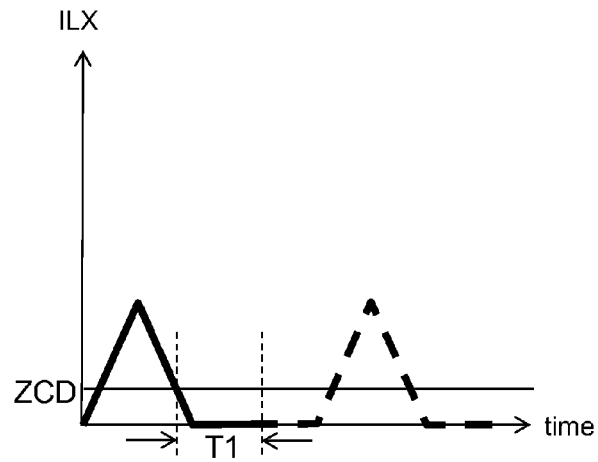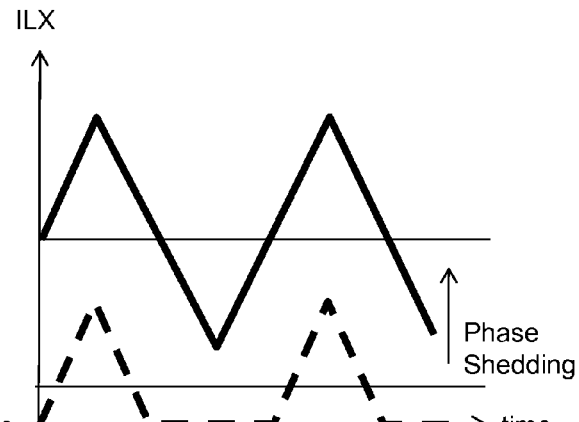
Fig. 5A          Fig. 5B
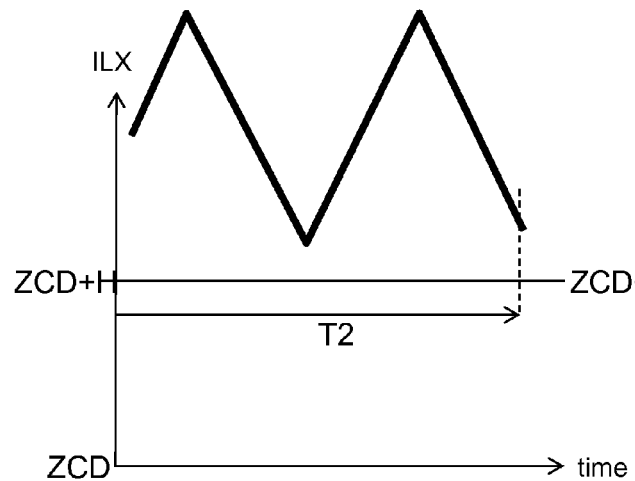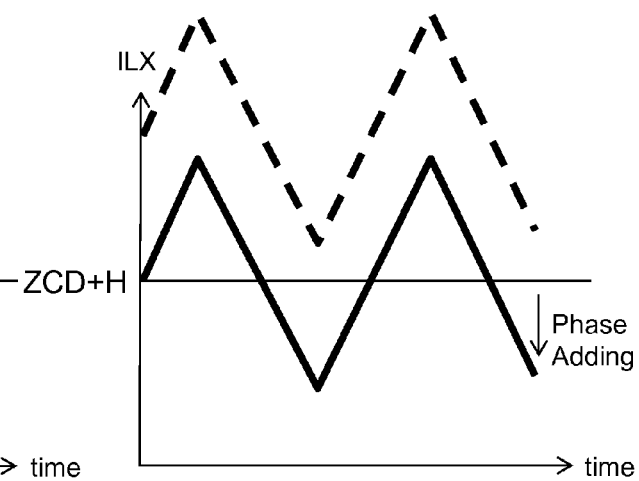
Fig. 6A          Fig. 6B

MULTI-PHASE SWITCHING REGULATOR AND CONTROL METHOD THEREOF

BACKGROUND OF THE INVENTION

1. Field of Invention

The present invention relates to a multi-phase switching regulator and a control method thereof; particularly, it relates to such multi-phase switching regulator and control method thereof wherein a number of active power stage circuits is increased or decreased according to zero current detection.

2. Description of Related Art

A multi-phase switching regulator includes multiple power stage circuits (i.e. multiple phases) and it is often used for supplying power to a central processing unit (CPU). The multi-phase switching regulator is capable of operating at a lower voltage and providing a higher current as compared to a general switching regulator, and it can provide an adaptive voltage positioning (AVP) function. When the CPU operates, the CPU does not always require high current. Therefore, a multi-phase switching regulator for supplying power to the CPU should have a function of phase adding/shedding control of the power stage circuits.

U.S. Pat. No. 6,764,274 discloses a multi-phase switching regulator, which increases/decreases the number of active power stage circuits (active phases) according to the output voltage which is correlated to the output current. According to the operation mechanism of AVP, when the output current increases, the output voltage decrease, and the multi-phase switching regulator increases the number of active power stage circuits to increase the heavy load efficiency. On the other hand, when the output current decreases, the output voltage increases, and the multi-phase switching regulator decreases the number of active power stage circuits to increase the light load efficiency.

U.S. Pat. No. 7,492,134 discloses a multi-phase switching regulator, which determines the number of the active power stage circuits according to the inductor current. When the inductor current increases, the number of active power stage circuits increases. On the other hand, when the inductor current decreases, the number of the active power stage circuits decreases. When the output voltage drops suddenly, the multi-phase switching regulator of U.S. Pat. No. 7,492,134 instantly switches to full phase operation, that is, to increase the number of active power stage circuits to a maximum number, such that an unnecessary over current protection or system damage may be avoided.

US 2010/0191986 discloses a multi-phase switching regulator, which determines the number of the active power stage circuits according to a voltage signal which is converted from an average of a total output current. When the output current increases, the number of the active power stage circuits increases. On the other hand, when the output current decreases, the number of the active power stage circuits decreases.

In the aforementioned prior art multi-phase switching regulators, the number of the active power stage circuits is determined by detecting the total output current or its related signal. However, to operate by such mechanism, the speed (response time) of phase adding/shedding is determined by the speed (response time) of detecting the inductor current. When the speed of detecting the inductor current is too fast, a mis-operation or current level shift may occur due to the incorrect phase adding/shedding. On the other hand, when the speed of detecting the inductor current is too slow, an unnecessary over current protection or system damage may occur.

Besides, in the aforementioned prior art multi-phase switching regulators, when the light load and heavy load conditions occur alternatingly, or when currents flowing through the power stage circuits are uneven one from another, the aforementioned prior art multi-phase switching regulators cannot respond immediately to operate at an optimum balanced point, which results in unnecessary power consumption.

In view of above, the present invention proposes a multi-phase switching regulator and a control method thereof, wherein the number active power stage circuits is increased or decreased according to zero current detection.

SUMMARY OF THE INVENTION

From one perspective, the present invention provides a multi-phase switching regulator, comprising: a plurality of power stage circuits, for converting an input voltage to an output voltage, wherein at least one power stage circuit is enabled or disabled according to a phase adding/shedding signal; at least one zero current detection circuit, which is coupled to a corresponding one of the power stage circuit, for generating a trigger signal according to an inductor current which is generated by the corresponding power stage circuit, a zero current reference signal, and an average reference signal; and a phase control circuit, which is coupled to the at least one power stage circuit and the zero current detection circuit, for generating the phase adding/shedding signal according to the trigger signal to enable or disable the at least one power stage circuit.

From another perspective, the present invention provides a control method of a multi-phase switching regulator, including: providing a plurality of power stage circuits to convert an input voltage to an output voltage, wherein at least one power stage circuit is enabled or disabled according to a phase adding/shedding signal; generating a trigger signal according to an inductor current which is generated by one of the power stage circuits, a zero current reference signal, and an average reference signal; and generating the phase adding/shedding signal according to the trigger signal to enable or disable the at least one power stage circuit.

In one preferable embodiment, when the inductor current is not higher than the zero current reference signal for a first predetermined time period, the phase adding/shedding signal disables the at least one power stage circuit.

In the aforementioned embodiment, preferably, when the inductor current is higher than the average reference signal for a second predetermined time period, the phase adding/shedding signal enables the at least one power stage circuit.

In one preferable embodiment, the average reference signal is higher than the zero current reference signal by a hysteresis margin.

In one embodiment, the zero current detection circuit preferably includes: a first comparator circuit, which is coupled to the corresponding power stage circuit, for generating a first comparison signal according to the inductor current and the zero current reference signal; a first timer circuit, which is coupled to the first comparator circuit, for generating a phase shedding trigger signal when the inductor current is not higher than the zero current reference signal for the first predetermined time period, such that the phase adding/shedding signal disables the at least one power stage circuit; a second comparator circuit, which is coupled to the corresponding power stage circuit, for generating a second comparison signal according to the inductor current and the average reference signal; and a second timer circuit, which is coupled to the second comparator circuit, for generating a phase adding trigger signal when the inductor current is higher than the average reference signal for the second predetermined time period, such that the phase adding/shedding signal enables the at least one power stage circuit.

In another preferable embodiment, the multi-phase switching regulator may further include a dynamic phase circuit, which is coupled to the phase control circuit, for generating a dynamic phase signal to adjust the number of power stage circuits to be added or shed.

In another embodiment, the multi-phase switching regulator may further include an adaptive phase circuit, which is coupled to the phase control circuit, for generating an adaptive phase signal to adjust the number of power stage circuits directly to a target number.

The objectives, technical details, features, and effects of the present invention will be better understood with regard to the detailed description of the embodiments below.

BRIEF DESCRIPTION OF THE DRAWINGS

FIG. 1 shows a first embodiment of the present invention.

FIGS. 2A-2J show synchronous and asynchronous buck, boost, inverting, buck-boost, and inverting-boost power stage circuits.

FIGS. 5A-5B and 6A-6B show signal waveforms of the signal ILX which is indicative of the inductor current of a corresponding phase according to the present invention.

DESCRIPTION OF THE PREFERRED EMBODIMENTS

Figure 3:
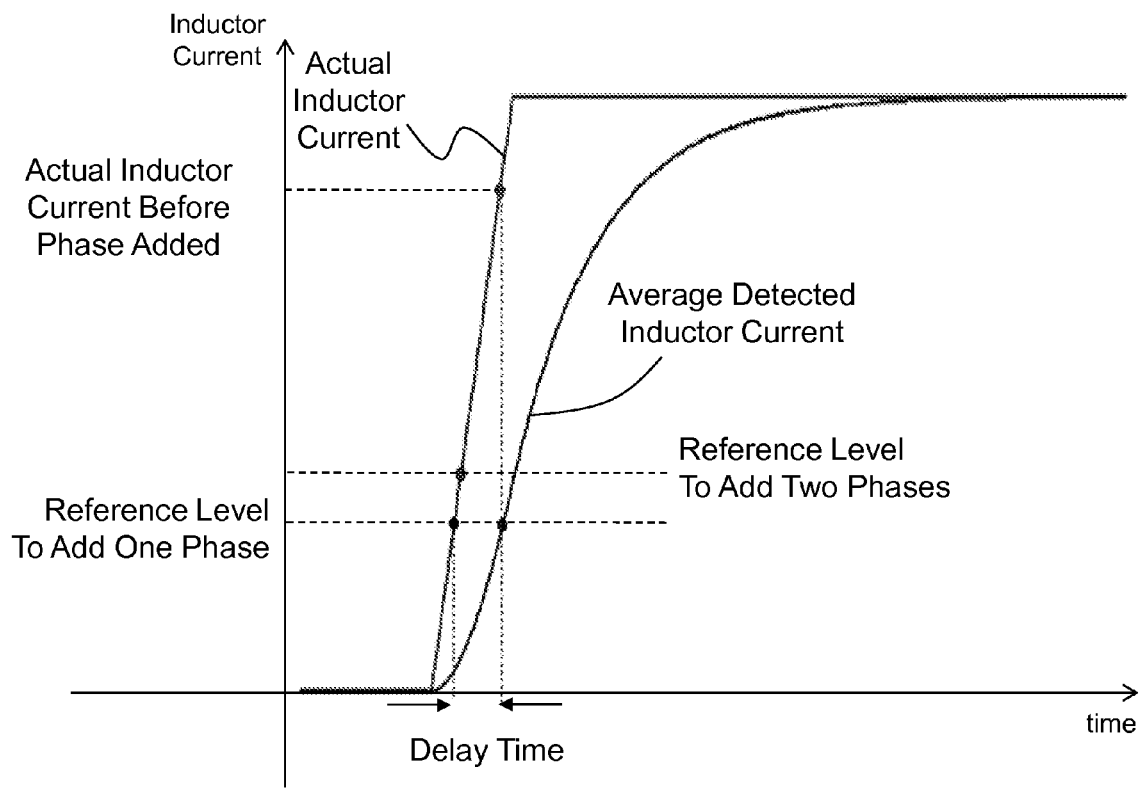
FIG. 3 shows the relationship between the actual inductor current and the average detected inductor current in the prior art.

Please refer to FIG. 1 for a first embodiment according to the present invention. As shown in FIG. 1, a multi-phase switching regulator 100 provides output current Iout to a load circuit 140. The multi-phase switching regulator 100 includes plural power stage circuits 110, plural zero current detection circuit 120, and a phase control circuit 130. The plural power stage circuits 110 convert an input voltage Vin to an output voltage Vout, wherein at least one power stage circuit 110 and preferably all power stage circuits 110 of the multi-phase switching regulator 100 can be enabled or disabled (i.e., become active or inactive) according to a phase adding/shedding signal. At least one zero current detection circuit 120 is coupled to a corresponding power stage circuit 110 (in the preferable embodiment of FIG. 1, each power stage circuit 110 of the multi-phase switching regulator 100 is coupled to a corresponding zero current detection circuit 120). The zero current detection circuit 120 is capable of generating a trigger signal according to the inductor current IL1-IL3 generated by the corresponding power stage circuit 110, a zero current reference signal, and an average reference signal. The phase control circuit 130 is coupled to the plural power stage circuits 110 and the plural zero current detection circuits 120, and it generates a phase adding/shedding signal according to one or more trigger signals. The power stage circuit 110 may be a synchronous and asynchronous buck, boost, inverting, buck-boost, or inverting-boost power stage circuit as shown in FIGS. 2A-2J.

The present invention is different from the prior art in that, the present invention does not detect the actual magnitude of the inductor current of each phase or a total amount of inductor currents of all phases to determine the number of active power stage circuits. Therefore, the present invention does not need to compromise between response time and accuracy. Besides, the present invention does not need to detect the output voltage to estimate the load current, in order to determine the number of active power stage circuits. Therefore, the present invention improves the response time. The multi-phase switching regulator and the control method according to the present invention only need to detect whether the inductor current of a power stage circuit crosses a reference point (a reference point corresponding to zero current or a predetermined current), but does not need to obtain the actual reading of the inductor current, and therefore, the time and circuitry required for measurement of the inductor current can be omitted, and the number of active power stage circuits can be adjusted adaptively within a faster response time. The present invention not only can increase the operation efficiency to convert the input voltage to the output voltage, but also increase the reliability of the multi-phase switching regulator because the phase adding/shedding operation is more accurate.

In the prior art multi-phase switching regulators, the number of active power stage circuits is basically determined by an estimation of the load current, and the estimation of the load current is determined by detecting and calculating a total of the inductor currents or an average of the detected inductor currents. FIG. 3 shows the problem associated with such a method. As shown in FIG. 3, let us assume that the multi-phase switching regulator is initially operating in a single-phase state, and it is supposed for the multi-phase switching regulator to switch to two-phase operation when the current required per phase exceeds a reference level for adding one phase, and switch to three-phase operation when the current required per phase exceeds a reference level for adding two phases. However, due to delay caused by the detection and calculation, as the multi-phase switching regulator determines to add one phase according to the average detected inductor current, the actual inductor current has increased dramatically to cause an over current condition which may damage the circuit in the power stage circuit, or at least, cause significantly unbalanced current distribution. According to the present invention, the problem is solved because it is only required for the inductor current to be compared with a reference (corresponding to zero current or a predetermined current), and because it is not required to measure the magnitude of the inductor current of each phase or to calculate an average or a total of the inductor currents, there is substantially no delay for the multi-phase switching regulator to respond to a phase adding/shedding requirement.

Figure 4:
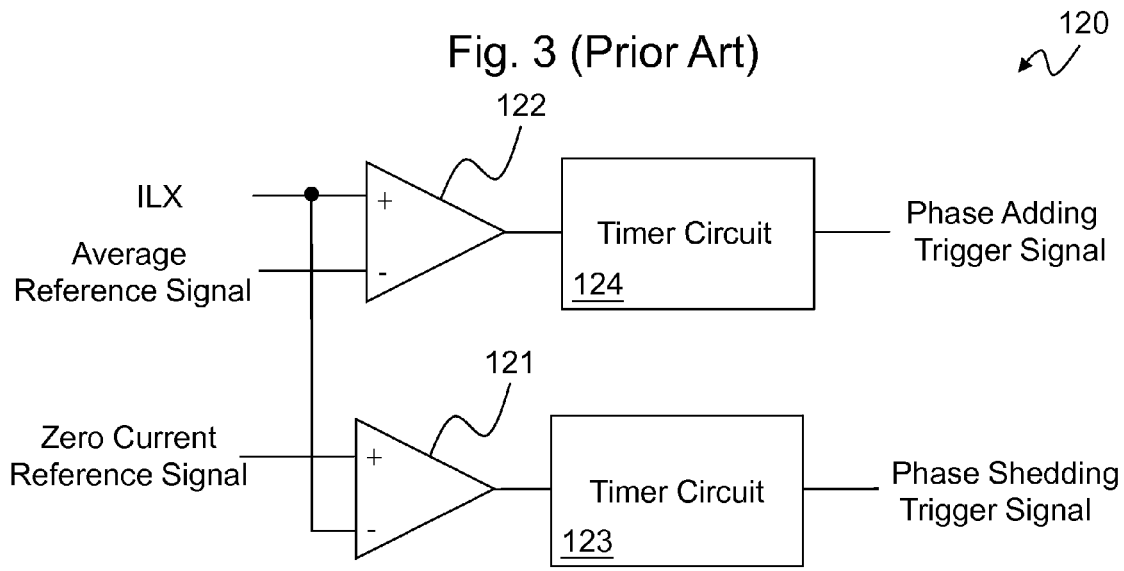
FIG. 4 shows a second embodiment of the present invention.

FIG. 4 shows a second embodiment of the present invention. This embodiment shows a more specific embodiment of the zero current detection circuit 120 in the multi-phase switching regulator 100. As shown in FIG. 4, the zero current detection circuit 120 includes comparator circuits 121 and 122, and timer circuits 123 and 124. The comparator circuit 121 is coupled to a corresponding power stage circuit 110, for receiving a signal ILX indicative of the inductor current of this phase. The comparator circuit 121 compares the signal ILX with the zero current reference signal (which is for example a level corresponding to zero current, but is not limited to this and can be a level corresponding to a predetermined current level such as a level slightly higher than zero current), and generates a comparison result which is inputted to the timer circuit 123. When the signal ILX is not higher than the zero current reference signal, the timer circuit 123 starts counting time, and after a predetermined period of time, the timer circuit 123 generates a phase shedding trigger signal, such that the phase adding/shedding signal generated by the phase control circuit 130 (referring to FIG. 1) indicates a phase shedding operation, and the number of active power stage circuits 110 is accordingly decreased.

On the other hand, the comparator circuit 122 is coupled to the corresponding power stage circuit 110, for receiving the signal ILX indicative of the inductor current of this phase. The comparator circuit 122 compares the signal ILX with the average reference signal, and generates a comparison result which is inputted to the timer circuit 124. When the signal ILX is higher than the average reference signal, the timer circuit 124 starts counting time, and after a predetermined period of time, the timer circuit 124 generates a phase adding trigger signal, such that the phase adding/shedding signal generated by the phase control circuit 130 (referring to FIG. 1) indicates a phase adding operation, and the number of active power stage circuits 110 is accordingly increased.

FIGS. 5A-5B shows signal waveforms of the signal ILX when a phase shedding operation is determined according to the present invention. As shown in FIG. 5A, when the signal ILX is not higher than the zero current reference signal ZCD for a predetermined period of time 11, a phase shedding trigger signal is generated (not shown), and the number of active power stage circuits 110 is decreased. After the number of active power stage circuits 110 is decreased, the inductor current in each active phase increases so the signal ILX increases as indicated by the solid bold line shown in FIG. 5B.

FIGS. 6A-6B shows signal waveforms of the signal ILX when a phase adding operation is determined according to the present invention. As shown in FIG. 6A, when the signal ILX is higher than an average reference signal for a predetermined period of time T2, (in this embodiment the average reference signal is set to be the level of the zero current reference signal ZCD plus a hysteresis margin H, a phase adding trigger signal is generated (not shown), and the number of active power stage circuits 110 is increased. After the number of active power stage circuits 110 is increased, the inductor current in each active phase decreases so the signal ILX decreases as indicated by the solid bold line shown in FIG. 6B.

According to the control mechanisms shown in FIGS. 5A-5B and 6A-6B, the number of active power stage circuits 110 can be adjusted without calculating a total or an average of the inductor currents, so the multi-phase switching regulator of the present invention can respond faster and more accurately over the prior art multi-phase switching regulator, and because the present invention does not require complicated circuitry for calculating the total or the average of the inductor currents, the hardware cost is also reduced.

In the aforementioned embodiment, the average reference signal is the zero current reference signal ZCD plus the hysteresis margin H; however, the present invention is not limited to this, and the average reference signal may be any predetermined reference level which is not related to the zero current reference signal ZCD.

Figure 7:
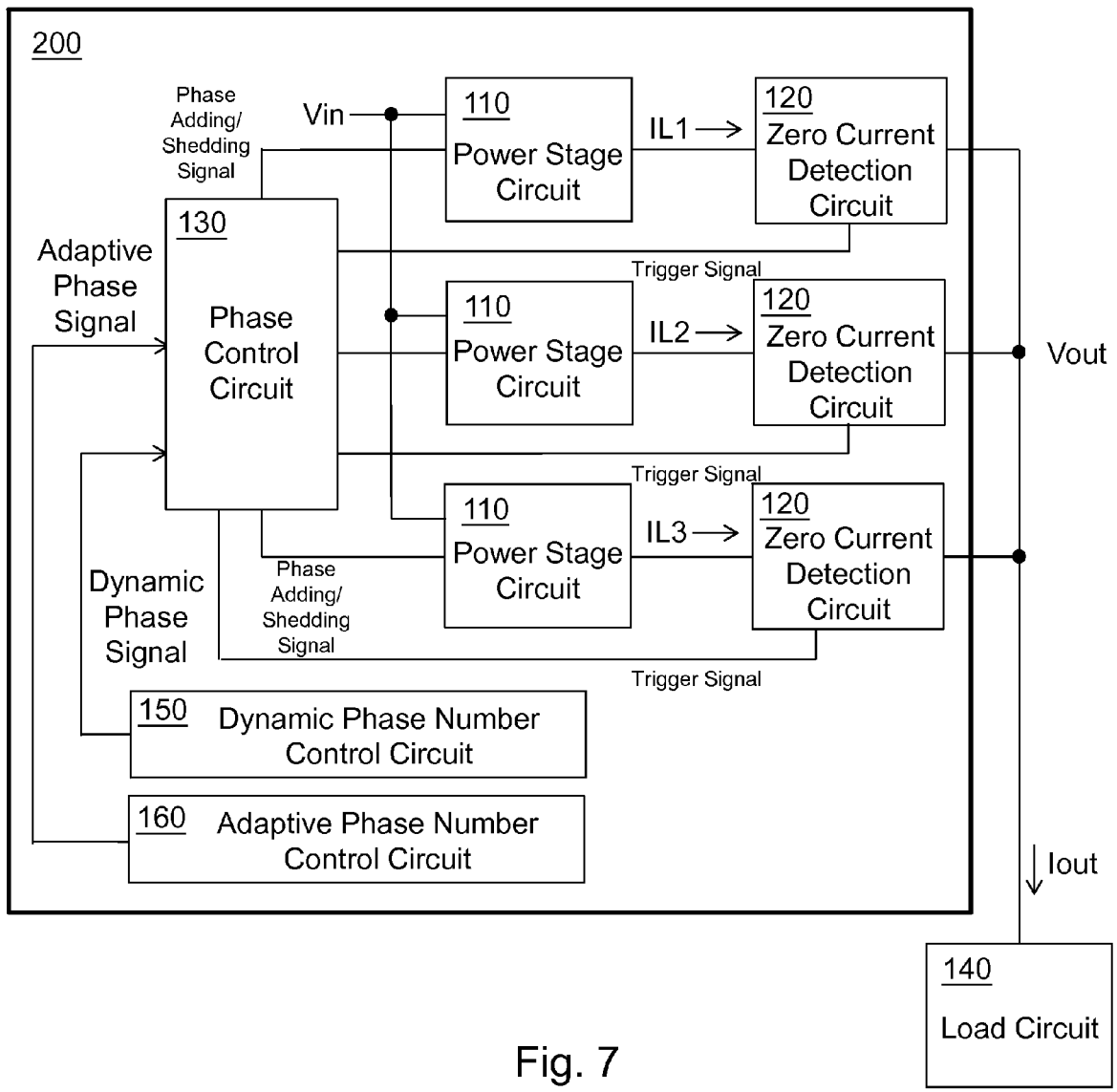
FIG. 7 shows a third embodiment of the present invention.

FIG. 7 shows a third embodiment of the present invention. This embodiment is different from the first embodiment in that, in this embodiment, a multi-phase switching regulator 200 further includes a dynamic phase number control circuit 150 and an adaptive phase number control circuit 160 which are coupled to the phase control circuit 130. The dynamic phase number control circuit 150 is for generating a dynamic phase number control signal to adjust the number of phases to be added or shed, and the phase control circuit 130 generates the phase adding/shedding signal accordingly. For example, the normal number of phases to be added or shed each time may be one, but the dynamic phase number control circuit 150 can adjust the number of phases to be added or shed each time to two or more. For example, when the requirement of load current suddenly changes (such as a requirement according to a dynamic VID of a CPU), a control system (not shown) may trigger the dynamic phase number control circuit 150 to generate the dynamic phase signal, such that the phase control circuit 130 immediately increases the number of active power stage circuits by a jump (i.e., to immediately enable several more power stage circuits which are previously inactive). The adaptive phase number control circuit 160 is for generating an adaptive phase number control signal to adjust the number of active power stage circuits directly to a target number, and the phase control circuit 130 generates the phase adding/shedding signal accordingly. For example, when there is a sudden output voltage drop which requires a quick response, the adaptive phase number control circuit 160 may generate the adaptive phase number control signal such that the phase control circuit 130 immediately enables all power stage circuits or a designated number of power stage circuits.

Figure 8:
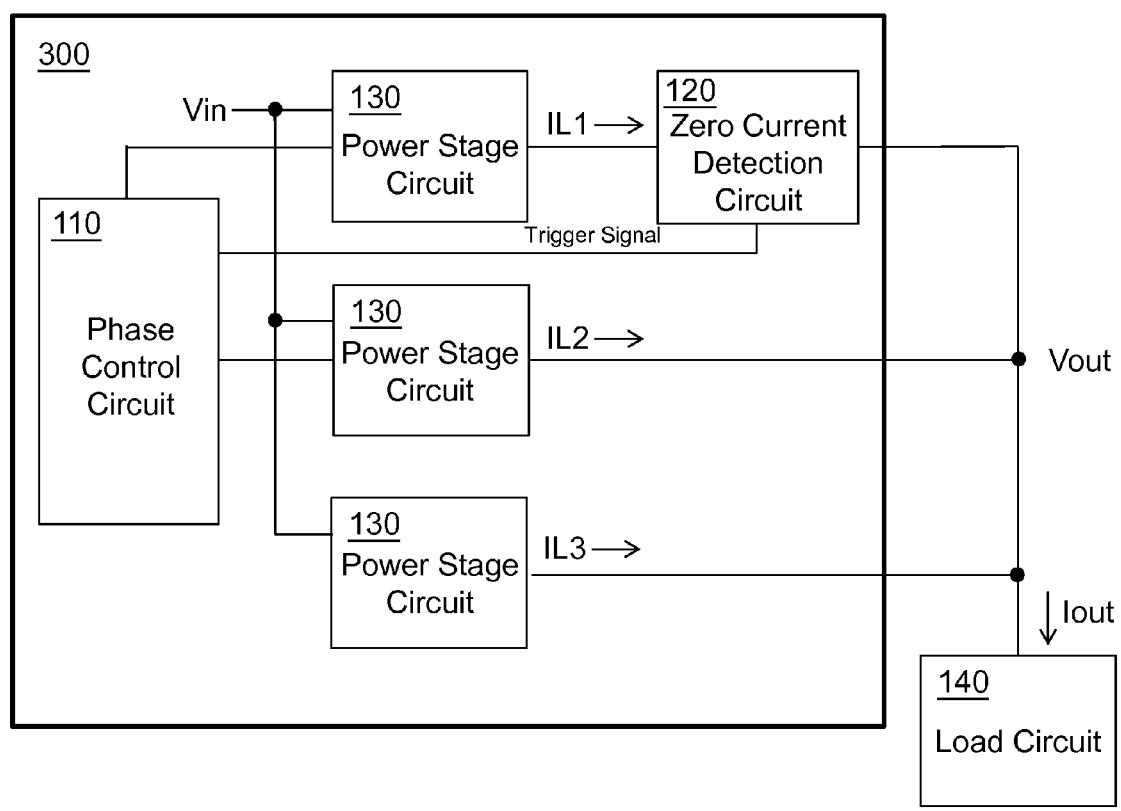
FIG. 8 shows a fourth embodiment of the present invention.

FIG. 8 shows a fourth embodiment of the present invention. This embodiment is different from the first embodiment in that, in this embodiment, a multi-phase switching regulator 300 includes plural power stage circuits 130, but not all of the plural power stage circuits 130 are coupled to the zero current detection circuits 120. As shown in the figure, for example, only one power stage circuit 130 is coupled to a corresponding zero current detection circuit 120. That is, the trigger signal may be generated by one zero current detection circuit 120, and the phase control circuit 110 determines the number of active power stage circuits 130 accordingly. Furthermore, in this embodiment, the phase control circuit 110 is not coupled to all the power stage circuits 130; the power stage circuit 130 which is not coupled to the phase control circuit 110 is not subject to phase adding/shedding control by the phase control circuit 110.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, a device or circuit which does not substantially influence the primary function of a signal can be inserted between any two devices or circuits in the shown embodiments, such as a switch or the like, so the term "couple" should include direct and indirect connections. For another example, the zero current reference signal or the average reference signal may have variable levels different from phase to phase instead of a constant level, and the variable levels may be optimized and adjusted according the actual condition of each phase. For another example, the positive and negative input terminals of the comparator circuits are interchangeable, with corresponding amendment of the circuits processing these signals. In view of the foregoing, the spirit of the present invention should cover all such and other modifications and variations, which should be interpreted to fall within the scope of the following claims and their equivalents.

What is claimed is:

1. A multi-phase switching regulator, comprising:
    a plurality of power stage circuits, for converting an input voltage to an output voltage, wherein at least one power stage circuit is enabled or disabled according to a phase adding/shedding signal;
    at least one zero current detection circuit, which is coupled to a corresponding one of the power stage circuit, for generating a trigger signal according to an inductor current which is generated by the corresponding power stage circuit, a zero current reference signal, and an average reference signal; and a phase control circuit, which is coupled to the at least one power stage circuit and the zero current detection circuit, for generating the phase adding/shedding signal according to the trigger signal to enable or disable the at least one power stage circuit;

wherein when the inductor current is not higher than the zero current reference signal for a first predetermined time period, the phase adding/shedding signal disables the at least one power stage circuit;

wherein when the inductor current is higher than the average reference signal for a second predetermined time period, the phase adding/shedding signal enables the at least one power stage circuit;

wherein the zero current detection circuit includes:
  a first comparator circuit, which is coupled to the corresponding power stage circuit, for generating a first comparison signal according to the inductor current and the zero current reference signal;
  a first timer circuit, which is coupled to the first comparator circuit, for generating a phase shedding trigger signal when the inductor current is not higher than the zero current reference signal for the first predetermined time period, such that the phase adding/shedding signal disables the at least one power stage circuit;
  a second comparator circuit, which is coupled to the corresponding power stage circuit, for generating a second comparison signal according to the inductor current and the average reference signal; and
  a second timer circuit, which is coupled to the second comparator circuit, for generating a phase adding trigger signal when the inductor current is higher than the average reference signal for the second predetermined time period, such that the phase adding/shedding signal enables the at least one power stage circuit.

2. The multi-phase switching regulator of claim 1, further comprising a dynamic phase circuit, which is coupled to the phase control circuit, for generating a dynamic phase signal to adjust the number of power stage circuits to be added or shed.

3. The multi-phase switching regulator of claim 1, further comprising an adaptive phase circuit, which is coupled to the phase control circuit, for generating an adaptive phase signal to adjust the number of power stage circuits directly to a target number.

4. The multi-phase switching regulator of claim 1, wherein the average reference signal is higher than the zero current reference signal by a hysteresis margin.

* * * * *